United States Patent [19]
Conley et al.

[11] 3,878,094
[45] Apr. 15, 1975

[54] SYSTEM FOR SEPARATING HYDROCARBONS FROM WATER

[75] Inventors: James D. Conley, Donald E. Belden, Sand Springs; Ralph D. Terhune, Tulsa, all of Okla.

[73] Assignee: Fram Corporation, East Providence, R.I.

[22] Filed: Nov. 27, 1972

[21] Appl. No.: 309,660

[52] U.S. Cl. .................. 210/96; 210/104; 210/115; 210/DIG. 5
[51] Int. Cl. ........................................... B01d 21/24
[58] Field of Search ........ 210/96, DIG. 5, 104, 114, 210/115, 239, 260

[56] References Cited
UNITED STATES PATENTS

| | | | |
|---|---|---|---|
| 2,588,794 | 3/1952 | Banton | 210/DIG. 5 |
| 3,035,701 | 5/1962 | May | 210/114 |
| 3,088,592 | 5/1963 | Clark | 210/DIG. 5 |
| 3,214,368 | 10/1965 | Muller | 210/DIG. 5 |
| 3,253,711 | 5/1966 | Young | 210/96 X |
| 3,339,736 | 9/1967 | Muller | 210/104 |
| 3,459,304 | 8/1969 | Brenchley | 210/96 X |
| 3,468,421 | 9/1969 | Hazel et al. | 210/96 |
| 3,645,398 | 2/1972 | Fiocoo | 210/DIG. 5 |

Primary Examiner—John Adee
Attorney, Agent, or Firm—Christie, Parker & Hale

[57] ABSTRACT

Apparatus for removing hydrocarbon pollutant from water featuring a mechanical emulsion breaker for removing emulsified hydrocarbon from the water stream, and, upstream of the emulsion breaker, a separator for removing from the stream free and entrained hydrocarbon.

1 Claim, 2 Drawing Figures

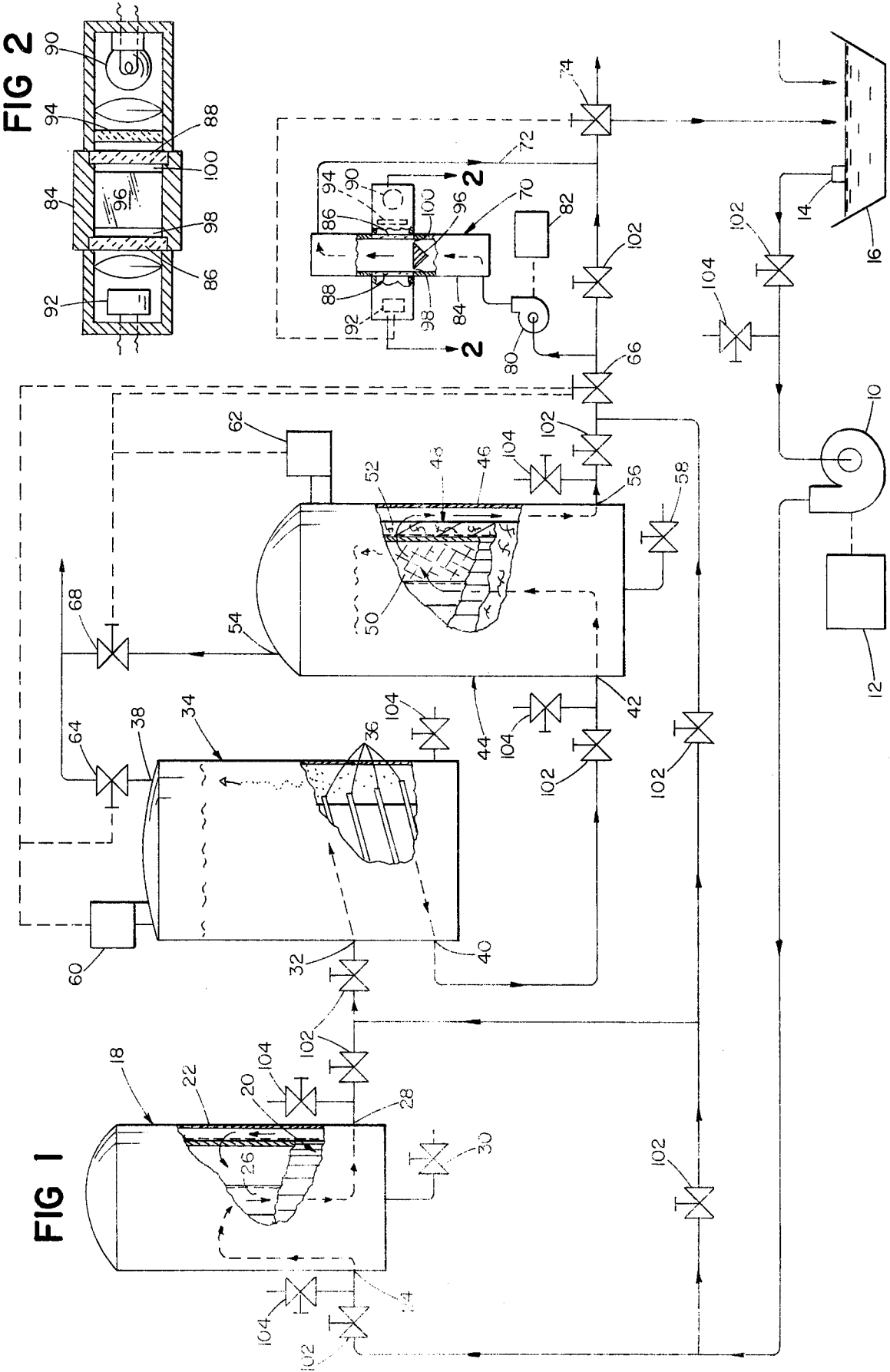

SYSTEM FOR SEPARATING HYDROCARBONS FROM WATER

BACKGROUND OF THE INVENTION

This invention relates to removing oils, fuels, and similar hydrocarbon pollutants from water.

SUMMARY OF THE INVENTION

The invention makes possible up to 100% removal of a wide variety of hydrocarbon pollutants (including, e.g., high specific gravity and high viscosity oils) from wastewater, accommodating variation of the incoming pollutant concentration over a wide range (including, e.g., the ability to handle large slugs of oil without upset of the system), and providing relatively water-free hydrocarbon as a by-product, all with simple and reliable apparatus having long life and high capacity, and with continuous monitoring of effluent quality.

In general, the invention features a mechanical emulsion breaker for removing emulsified hydrocarbon from the water stream, and, upstream of the emulsion breaker, a separator for removing from the stream free and entrained hydrocarbon. In preferred embodiments the invention features a preconditioner upstream of the emulsion breaker for removing solids and initiating the separation of hydrocarbon; controls for maintaining the hydrocarbon-water interface levels in the separator and the emulsion breaker within predetermined limits despite variation of the hydrocarbon concentration in the incoming stream, to thus prevent re-mixing of water and hydrocarbon, the controls operating in a closed, pressurized system by sensing the interfaces and adjusting the hydrocarbon and water discharge rates; and a monitor for continuously measuring hydrocarbon concentration in the treated water discharge, providing a signal to recycle that discharge in the event effluent quality is too low.

Other advantages and features of the invention will be apparent from the description and drawings herein of a preferred embodiment thereof.

BRIEF DESCRIPTION OF THE DRAWINGS

FIG. 1 is a semi-schematic, partially broken away diagram of a treatment system; and FIG. 2 is an enlarged sectional view through 2—2 of FIG. 1.

DESCRIPTION OF THE PREFERRED EMBODIMENT

Referring to the drawings, suction pump 10 (low energy to minimize turbulence and emulsification) driven by motor 12 draws wastewater through floating suction pickup 14 from the top of holding tank or reservoir 16, the floating pickup taking advantage of some solids settling in the reservoir and forming the upstream end of a pressurized closed system. The pump delivers the wastewater to preconditioner 18, consisting of an annular replaceable cartridge 20 mounted in a housing 22 to receive flow passing from inlet 24 to the outer surface of the cartridge, through the cartridge radially to its central passage 26, and then out through outlet 28.

Cartridge 20 provides a porous polyester fiber matrix which (due to the preferential affinity of the fibers for hydrocarbon rather than water) tends to gather the free hydrocarbon into enlarged droplets, and which removes, by filtration, solid particles in the 50 micron and above range. The cartridge can be cleaned by backwashing through valve 30, and consists of either a batt wound in successively looser turns on a perforated centertube, or (as shown) a pleated sheet medium.

The preconditioned stream passes from outlet 28 through inlet 32 into conventional gravity separator 34 which, with the aid of tilted plates 36, allows the free and entrained hydrocarbons to float to the top for removal through outlet 38, while the water, now containing substantially only emulsified hydrocarbon, discharges at the bottom through outlet 40 for passage to inlet 42 of emulsion breaker 44.

Emulsion breaker 44 is designed to separate from the water stream any remaining traces of free hydrocarbon, and any emulsified hydrocarbon. It contains in housing 46 an annular cartridge 48 having an inner stage 50 of pleated sheet medium (1–5 micron rating, preferably less than 10 micron, to effectively break the emulsion) between perforated cylindrical shells, including natural and polyester fibers impregnated with melamine or similar resins, the polyester and resins being preferentially wettable by hydrocarbon to provide high wet strength and low pressure drop in the presence of oil-water emulsion, the natural fibers serving to tighten the medium to achieve the needed micron rating; and an outer stage 52 consisting of a polyester batt. The batt is also preferentially oil-wettable, further enhances separation, and removes from the oil droplets any water bubbles surrounding them after the emulsion is broken. Flow through the cartridge is radial from inside to outside. Separated oil is discharged at the top through outlet 54, and water at the bottom through outlet 56. The cartridge is strong enough to withstand cleaning by back-washing through valve 58.

Interface controls 60 and 62 continuously sense the positions of the oil-water interfaces in separator 34 and emulsion breaker 44, respectively, e.g. employing displacer members which are sensitive to changes in buoyancy. These controls provide output signals to equal percentage throttling valves for adjustment of hydrocarbon and water discharge rates to reverse any changes in interface position. Thus, control 60 is connected to valve 64 which controls oil flow through outlet 38, and to valve 66 which controls water flow through outlet 56 and, since the entire system is pressurized, through outlet 40 of separator 34 as well. Should the interface in separator 34 rise toward outlet 38 due to a decrease in hydrocarbon concentration in the incoming stream, control 60 will partially (or fully, if needed) close valve 64, reducing the oil discharge rate, and correspondingly open valve 66, increasing the water discharge rate, both adjustments working to lower the interface and prevent water discharge through oil outlet 38. Conversely, should the interface drop toward water outlet 40, due to, e.g., a slug of oil in the incoming stream, control 60 will open valve 64 and close valve 66, protecting water outlet 40 from oil discharge. Control 62 acts similarly with respect to valve 66 and valve 68 controlling oil flow rate through outlet 54 of the emulsion breaker. Thus, the system continues effective operation despite wide variation in hydrocarbon concentration in the incoming stream, automatically compensating for that variation.

Fluid analyzer 70 continuously samples the water effluent from downstream of valve 66 and returns the sample through line 72 for flow with the rest of the effluent through three-way valve 74, providing a direct readout in parts per million of oil concentration in the stream. In the event oil concentration in the effluent is greater than a first threshold the analyzer actuates valve 74 to recycle the effluent to reservoir 16, while still continuing to sample; in the event the oil concentration reaches a second threshold the system is shut down.

Analyzer 70 includes a 3600 RPM centrifugal pump 80 driven by motor 82, and draws a sample at 25 gallons/minute and highly disperses any oil throughout the sample. The sample is pumped through tube 84 (square cross-section) having opposing windows 86 and 88 through which shines a light beam from bulb 90 to photo-diode 92. Infra-red filter 94 limits the light passing through the sample so that the frequency range at half peak intensity is preferably no less than 7500 Angstroms (the preferred filter having a peak of 8000 Angstroms with a half peak bandwidth of 375 Angstroms); as a result the light intensity sensed by diode 94 is largely independent of turbidity due to solids suspended in the water, thus providing a reading accurately reflecting hydrocarbon concentration, independent of the nature or color of the hydrocarbon.

To avoid clouding of windows 86 and 88, tapered flow divertor 96 defines restricted passages 98 and 100 respectively below the windows, dividing the sample stream in two, and forcing all the liquid to flow through the passages. The resulting fast moving curtains of liquid flowing past the windows prevent accumulation of oil film thereon.

Shut-off valves 102 and sample valves 104 are provided where shown.

The details of the emulsion breaker disclosed herein are the joint invention of James C. Duke and Ralph D. Terhune.

Other embodiments are within the following claim:

We claim:

1. In a system for removing hydrocarbon pollutant from a water stream to provide a purified effluent stream, that improvement comprising a separator for removing from said stream free and entrained hydrocarbon, said separator having separate hydrocarbon and water outlets, a mechanical emulsion breaker for removing emulsified hydrocarbon from said stream, said emulsion breaker having an inlet connected to said separator water outlet, a control mounted to continuously sense the hydrocarbon-water interface in said separator, and valves for controlling the flow rates through said outlets, said control being connected to said valves for adjustment of said flow rates in response to changes in the position and said interface to counteract changes therein, said system being closed and pressurized and a fluid analyzer and associated conduit means for continuously sampling the water effluent from said emulsion breaker and returning the sample to said effluent stream, said analyzer including means for initiating the recycling of said effluent when hydrocarbon concentration therein reaches a threshold, while continuing to sample said effluent.

* * * * *